US012583554B2

(12) United States Patent
Numata et al.

(10) Patent No.: US 12,583,554 B2
(45) Date of Patent: Mar. 24, 2026

(54) HUMAN-POWERED VEHICLE CONTROL DEVICE AND COMPONENT FOR HUMAN-POWERED VEHICLE

(71) Applicant: Shimano Inc., Osaka (JP)

(72) Inventors: Fumihide Numata, Osaka (JP); Kazumasa Mitsunari, Osaka (JP); Keita Michikawa, Osaka (JP)

(73) Assignee: Shimano Inc., Osaka (JP)

( * ) Notice: Subject to any disclaimer, the term of this patent is extended or adjusted under 35 U.S.C. 154(b) by 600 days.

(21) Appl. No.: 18/075,626

(22) Filed: Dec. 6, 2022

(65) Prior Publication Data

US 2023/0242208 A1 Aug. 3, 2023

(30) Foreign Application Priority Data

Jan. 31, 2022 (JP) ................................. 2022-013661

(51) Int. Cl.
B62M 6/45 (2010.01)
B62M 6/55 (2010.01)

(52) U.S. Cl.
CPC ................ B62M 6/45 (2013.01); B62M 6/55 (2013.01)

(58) Field of Classification Search
CPC .......... B62M 6/45; B62M 6/55; B62M 9/122; B62M 9/132; B62M 25/08; B62J 6/01; B62J 2001/085; B62J 45/20; B62L 3/00
See application file for complete search history.

(56) References Cited

U.S. PATENT DOCUMENTS

| | | | |
|---|---|---|---|
| 5,211,102 A | 5/1993 | Muta | |
| 10,086,708 B2 | 10/2018 | Ichida et al. | |
| 12,365,421 B1 * | 7/2025 | Hamed | B62L 3/023 |
| 2010/0218633 A1 * | 9/2010 | Ichida | B62M 25/08 |
| | | | 74/473.12 |
| 2016/0257370 A1 * | 9/2016 | Hashimoto | B62K 23/02 |
| 2019/0241236 A1 * | 8/2019 | Lin | B62M 9/132 |
| 2021/0070397 A1 * | 3/2021 | Komada | B62M 9/132 |
| 2023/0089903 A1 * | 3/2023 | Sakagawa | B60L 3/0092 |
| | | | 701/51 |
| 2023/0159135 A1 * | 5/2023 | Sakagawa | B62J 43/30 |
| | | | 74/473.12 |
| 2024/0278868 A1 * | 8/2024 | Nozaki | B62M 25/08 |
| 2025/0002109 A1 * | 1/2025 | Matsuda | B62J 50/22 |

FOREIGN PATENT DOCUMENTS

| | | | | |
|---|---|---|---|---|
| DE | 60224609 T2 * | 1/2009 | | B62M 9/122 |
| JP | 2019-93904 A | 6/2019 | | |
| WO | WO-9933698 A1 * | 7/1999 | | B62M 9/132 |

* cited by examiner

*Primary Examiner* — Drew J Brown
(74) *Attorney, Agent, or Firm* — Spencer Fane, LLP

(57) ABSTRACT

A human-powered vehicle control device is provided for a human-powered vehicle. The human-powered vehicle control device includes a master electronic controller configured to control a first component and a second component. The first component is configured to be controlled by at least one of the master electronic controller and a first slave electronic controller. The master electronic controller is configured to restrict operation of at least one of the first component and the second component based on a first operation signal transmitted from the first slave electronic controller in a case where the first component is controlled by the first slave electronic controller.

21 Claims, 10 Drawing Sheets

HUMAN-POWERED VEHICLE CONTROL DEVICE AND COMPONENT FOR HUMAN-POWERED VEHICLE

CROSS-REFERENCE TO RELATED APPLICATIONS

This application claims priority to Japanese Patent Application No. 2022-013661, filed on Jan. 31, 2022. The entire disclosure of Japanese Patent Application No. 2022-013661 is hereby incorporated herein by reference.

BACKGROUND

Technical Field

The present disclosure generally relates to a relates to a human-powered vehicle control device for a human-powered vehicle and a component for a human-powered vehicle.

Background Information

Japanese Patent No. 5,211,102 (Patent document 1) describes an example of a human-powered vehicle including components.

SUMMARY

It is an objective of the present disclosure to provide a human-powered vehicle control device for a human-powered vehicle that controls components in a preferred manner and to provide a component for a human-powered vehicle.

A human-powered vehicle control device in accordance with a first aspect of the present disclosure is for a human-powered vehicle. The human-powered vehicle control device comprises a master electronic controller configured to control a first component and a second component. The first component is configured to be controlled by at least one of the master electronic controller and a first slave electronic controller. The master electronic controller is configured to restrict operation of at least one of the first component and the second component based on a first operation signal transmitted from the first slave electronic controller in a case where the first component is controlled by the first slave electronic controller.

With the human-powered vehicle control device in accordance with the first aspect, in a case where the first component is controlled by the first slave electronic controller, the master electronic controller restricts operation of at least one of the first component and the second component based on the first operation signal transmitted from the first slave electronic controller. This controls a plurality of components in a preferred manner.

In accordance with a second aspect of the present disclosure, in the human-powered vehicle control device according to the first aspect, the master electronic controller is configured to permit operation of the second component in a case where the first component is operated by the first slave electronic controller and the first component completes an operation or in a case where the first component is operated by the first slave electronic controller and a first period elapses after the first component initiates an operation.

With the human-powered vehicle control device in accordance with the second aspect, the master electronic controller permits operation of the second component in a case where the first component completes an operation or in a case where the first period elapses after the first component initiates an operation. This operates the second component in a preferred manner.

In accordance with a third aspect of the present disclosure, in the human-powered vehicle control device according to the first or second aspect, the first slave electronic controller is configured to transmit a first completion signal to the master electronic controller in a case where the first component completes an operation, and the master electronic controller is configured to permit operation of the second component based on the first completion signal.

With the human-powered vehicle control device in accordance with the third aspect, the first slave electronic controller transmits the first completion signal to the master electronic controller in a case where the first component completes an operation. Thus, the master electronic controller controls the second component based on the first completion signal in a preferred manner.

In accordance with a fourth aspect of the present disclosure, in the human-powered vehicle control device according to any one of the first to third aspects, the second component is configured to be controlled by at least one of the master electronic controller and a second slave electronic controller. Further, the master electronic controller is configured to restrict operation of at least one of the first component and the second component based on a second operation signal transmitted from the second slave electronic controller in a case where the second component is controlled by the second slave electronic controller.

With the human-powered vehicle control device in accordance with the fourth aspect, in a case where the second component is controlled by the second slave electronic controller, the master electronic controller restricts operation of at least one of the first component and the second component based on a second operation signal transmitted from the second slave electronic controller. This controls a plurality of components in a preferred manner.

In accordance with a fifth aspect of the present disclosure, in the human-powered vehicle control device according to the fourth aspect, the master electronic controller is configured to permit operation of the first component in a case where the second component is operated by the second slave electronic controller and the second component completes an operation or in a case where the second component is operated by the second slave electronic controller and a second period elapses after the second component initiates an operation.

With the human-powered vehicle control device in accordance with the fifth aspect, the master electronic controller permits operation of the first component in a case where the second component completes an operation or in a case where the second period elapses after the second component initiates an operation. This operates the first component in a preferred manner.

In accordance with a sixth aspect of the present disclosure, the human-powered vehicle control device according to the fourth or fifth aspect is configured so that the second slave electronic controller is configured to transmit a second completion signal to the master electronic controller in a case where the second component completes an operation. The master electronic controller is configured to permit operation of the first component based on the second completion signal.

With the human-powered vehicle control device human-powered vehicle in accordance with the sixth aspect, the second slave electronic controller transmits the second completion signal to the master electronic controller in a case where the second component completes an operation. This allows the master electronic controller to control the first component in a preferred manner based on the second completion signal.

In accordance with a seventh aspect of the present disclosure, in the human-powered vehicle control device according to the fifth or sixth aspect, the master electronic controller is configured to transmit a second component restriction signal that restricts initiation of operation of the second component to the second slave electronic controller in order to restrict operation of the second component.

With the human-powered vehicle control device in accordance with the seventh aspect, the second slave electronic controller restricts operation of the second component in accordance with the second component restriction signal transmitted from the master electronic controller. This restricts operation of the second component.

In accordance with an eighth aspect of the present disclosure, the human-powered vehicle control device according to the seventh aspect further comprises the second slave electronic controller. The second slave electronic controller is configured to control the second component so that the second component initiates an operation in a case where a second component operation condition for initiating operation of the second component is satisfied and the second component restriction signal is not received from the master electronic controller.

With the human-powered vehicle control device in accordance with the eighth aspect, the second slave electronic controller readily initiates operation of the second component in a case where the second component operation condition for initiating operation of the second component is satisfied and the second component restriction signal is not received from the master electronic controller.

In accordance with a ninth aspect of the present disclosure, in the human-powered vehicle control device according to the eighth aspect, the second slave electronic controller is configured to control the second component so that the second component does not initiate an operation in a case where the second component operation condition is satisfied and the second component restriction signal is received from the master electronic controller.

With the human-powered vehicle control device in accordance with the ninth aspect, the second slave electronic controller restricts operation of the second component in a case where the second component operation condition is satisfied and the second component restriction signal is received.

In accordance with a tenth aspect of the present disclosure, in the human-powered vehicle control device according to any one of the first to ninth aspects, the master electronic controller is configured to transmit a first component restriction signal for restricting initiation of operation of the first component to the first slave electronic controller in order to restrict operation of the first component.

With the human-powered vehicle control device in accordance with the tenth aspect, the first slave electronic controller restricts operation of the first component in a preferred manner in accordance with the first component restriction signal transmitted from the master electronic controller.

In accordance with an eleventh aspect of the present disclosure, the human-powered vehicle control device according to the tenth aspect further comprises the first slave electronic controller. The first slave electronic controller is configured to control the first component so that the first component initiates an operation in a case where a first component operation condition for initiating operation of the first component is satisfied and the first component restriction signal is not received from the master electronic controller.

With the human-powered vehicle control device in accordance with the eleventh aspect, the first slave electronic controller readily initiates operation of the first component in a case when the first component operation condition is satisfied and the first component restriction signal is not received.

In accordance with a twelfth aspect of the present disclosure, in the human-powered vehicle control device according to the eleventh aspect, the first slave electronic controller is configured to control the first component so that the first component does not initiate an operation in a case where the first component operation condition is satisfied and the first component restriction signal is received from the master electronic controller.

With the human-powered vehicle control device in accordance with the twelfth aspect, the first slave electronic controller restricts operation of the first component in a case where the first component operation condition is satisfied and the first component restriction signal is received.

In accordance with a thirteenth aspect of the present disclosure, in the human-powered vehicle control device according to the eleventh or twelfth aspect, the first slave electronic controller is configured to switch a control state between a first control state and a second control state, the first slave electronic controller is configured to transmit the first operation signal to the master electronic controller if the first component operation condition is satisfied in a case where the control state is the first control state, and the first slave electronic controller is configured to control the first component so that the first component initiates an operation without the first slave electronic controller transmitting the first operation signal to the master electronic controller if the first component operation condition is satisfied in a case where the control state is the second control state.

With the human-powered vehicle control device in accordance with the thirteenth aspect, the master electronic controller restricts operation of at least one of the first component and the second component in a case where the control state is the first control state. Further, with the human-powered vehicle control device in accordance with the thirteenth aspect, operation of the first component is initiated without the first operation signal being transmitted if the first component operation condition is satisfied in a case where the control state is the second control state. This reduces the communication load on the master electronic controller and the first slave electronic controller.

In accordance with a fourteenth aspect of the present disclosure, in the human-powered vehicle control device according to the thirteenth aspect, the master electronic controller is configured to transmit a switch signal to the first slave electronic controller to switch the control state of the first slave electronic controller between the first control state and the second control state, and the first slave electronic controller is configured to switch the control state between the first control state and the second control state based on the switch signal.

With the human-powered vehicle control device in accordance with the fourteenth aspect, the control state is switched in a preferred manner between the first control state and the second control state based on the switch signal.

In accordance with a fifteenth aspect of the present disclosure, in the human-powered vehicle control device according to any one of the first to fourteenth aspects, the first slave electronic controller is provided in the first component.

With the human-powered vehicle control device in accordance with the fifteenth aspect, the first slave electronic controller is provided in the first component. This simplifies the electrical wiring.

In accordance with a sixteenth aspect of the present disclosure, in the human-powered vehicle control device according to any one of the first to fifteenth aspects, at least one of the first component and the second component includes a transmission device.

With the human-powered vehicle control device in accordance with the sixteenth aspect, the master electronic controller controls the transmission device in a preferred manner.

In accordance with a seventeenth aspect of the present disclosure, in the human-powered vehicle control device according to any one of the first to fifteenth aspects, at least one of the first component and the second component includes a motor that applies a propulsion force to a human-powered vehicle.

With the human-powered vehicle control device in accordance with the seventeenth aspect, the master electronic controller controls the motor in a preferred manner.

In accordance with an eighteenth aspect of the present disclosure, in the human-powered vehicle control device according to any one of the first to fifteenth aspects, the first component and the second component are configured to be supplied with electric power from a battery via a drive unit including a motor that applies a propulsion force to a human-powered vehicle.

With the human-powered vehicle control device in accordance with the eighteenth aspect, the first component and the second component are supplied with electric power from the battery via the drive unit. This operates the first component and the second component with the electric power of the same battery having a large capacity.

In accordance with a nineteenth aspect of the present disclosure, the human-powered vehicle control device according to the eighteenth aspect is configured so that the master electronic controller is provided in a human-powered vehicle component that connects the drive unit to the first component and the second component in a manner allowing for communication.

With the human-powered vehicle control device in accordance with the nineteenth aspect, the master electronic controller performs communication with the drive unit and both of the first component and the second component. Thus, the master electronic controller controls the first component and the second component in a preferred manner.

A twentieth aspect of the present disclosure is a component for a human-powered vehicle. The component comprises the human-powered vehicle control device according to any one of the first to sixteenth aspects.

With the component in accordance with the twentieth aspect, the components are controlled in a preferred manner.

In accordance with a twenty-first aspect of the present disclosure, in the component according to the twentieth aspect, the first component and the second component are configured to be supplied with electric power from a battery via a drive unit including a motor that applies a propulsion force to a human-powered vehicle. The component comprises a connector that connects the drive unit to the first component and the second component in a manner allowing for communication.

With the component in accordance with the twenty-first aspect, the component includes the connector that allows for communication with the drive unit and both of the first component and the second component.

The human-powered vehicle control device for a human-powered vehicle in accordance with the present disclosure controls a plurality of components in a preferred manner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

With reference to FIGS. 1 to 11, a human-powered vehicle control device 60 for a human-powered vehicle 10 and a component 40 for the human-powered vehicle 10 in accordance with the present disclosure will now be described.

The human-powered vehicle 10 is a vehicle that includes at least one wheel and is driven by at least human driving force. The human-powered vehicle 10 includes, for example, various types of bicycles such as a mountain bike, a road bike, a city bike, a cargo bike, a handcycle, and a recumbent bike. The number of wheels of the human-powered vehicle is not limited. The human-powered vehicle 10 includes, for example, a monocycle and vehicles having two or more wheels. The human-powered vehicle 10 is not limited to a vehicle driven by only a human driving force. The human-powered vehicle includes an e-bike that uses not only a human driving force but also a drive force of an electric motor for propulsion. An e-bike includes an electric assist bicycle that uses an electric motor to assist in propulsion. In the description hereafter, the human-powered vehicle 10 refers to an electric assist bicycle.

Figure 1:
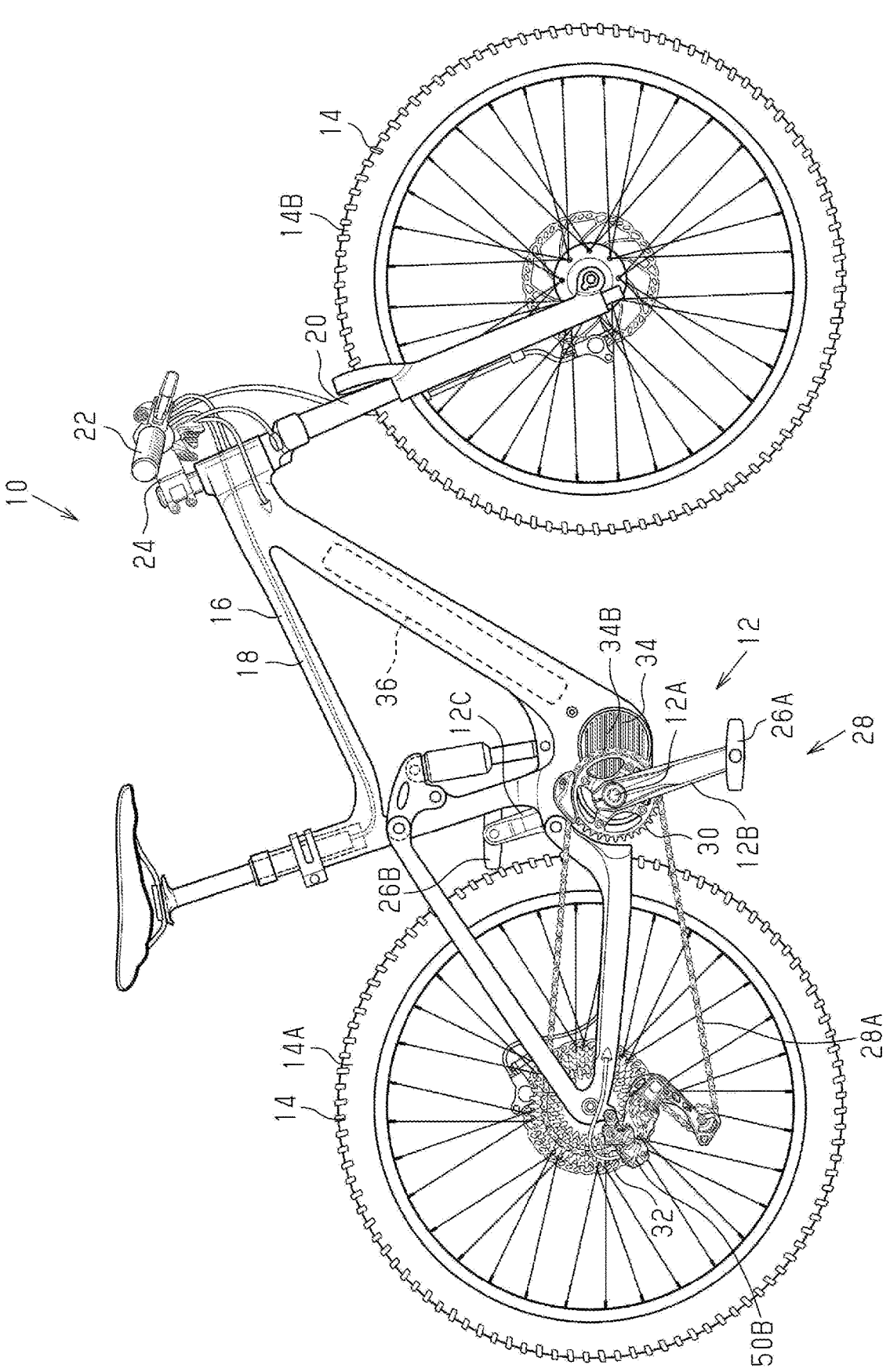
FIG. 1 is a side elevational view of a human-powered vehicle including a human-powered vehicle control device and a component in accordance with an embodiment.

As shown in FIG. 1, the human-powered vehicle 10 includes a crank 12 to which a human driving force is input. The human-powered vehicle 10 further includes wheels 14 and a body 16. The wheels 14 include a rear wheel 14A and a front wheel 14B. The body 16 includes a frame 18, a front fork 20, a handlebar 22, and a stem 24. The body 16 can further include at least one of a suspension and a carriage. The frame 18 includes, for example, at least one of a top tube, a down tube, a seat tube, a seat stay, and a chain stay. The body 16 further includes a seatpost attached to the seat tube.

The crank 12 further includes an input shaft 12A, which is rotatable relative to the frame 18, and two crank arms 12B and 12C, which are respectively provided on the axial ends of the input shaft 12A. The input shaft 12A is a crank axle. Pedals 26A and 26B are respectively coupled to the crank arms 12B and 12C.

Rotation of the crank 12 drives the rear wheel 14A. The rear wheel 14A is supported by the frame 18. The crank 12 is linked to the rear wheel 14A by a drive mechanism 28. The drive mechanism 28 includes a first rotational body 30 coupled to the input shaft 12A. The input shaft 12A and the first rotational body 30 can be coupled to each other so as to rotate integrally. Alternatively, the input shaft 12A and the first rotational body 30 can be coupled to each other by a first one-way clutch. The first one-way clutch is configured to rotate the first rotational body 30 forward in a case where the crank 12 is rotated forward and permit relative rotation of the crank 12 and the first rotational body 30 in a case where the crank 12 is rotated backward. The first rotational body 30 includes a sprocket, a pulley, or a bevel gear. The drive mechanism 28 further includes a second rotational body 32 and a linking member 28A. The linking member 28A transmits the rotational force of the first rotational body 30 to the second rotational body 32. The linking member 28A includes, for example, a chain, a belt, or a shaft.

The second rotational body 32 is coupled to the rear wheel 14A. The second rotational body 32 includes a sprocket, a pulley, or a bevel gear. Preferably, a second one-way clutch is provided between the second rotational body 32 and the rear wheel 14A. The second one-way clutch is configured to rotate the rear wheel 14A forward in a case where the second rotational body 32 is rotated forward and permit relative rotation of the second rotational body 32 and the rear wheel 14A in a case where the second rotational body 32 is rotated backward.

The front wheel 14B is attached to the frame 18 by the front fork 20. The handlebar 22 is coupled to the front fork 20 by the stem 24. In the present embodiment, the rear wheel 14A is linked to the crank 12 by the drive mechanism 28. At least one of the rear wheel 14A and the front wheel 14B can be linked to the crank 12 by the drive mechanism 28.

Figure 2:
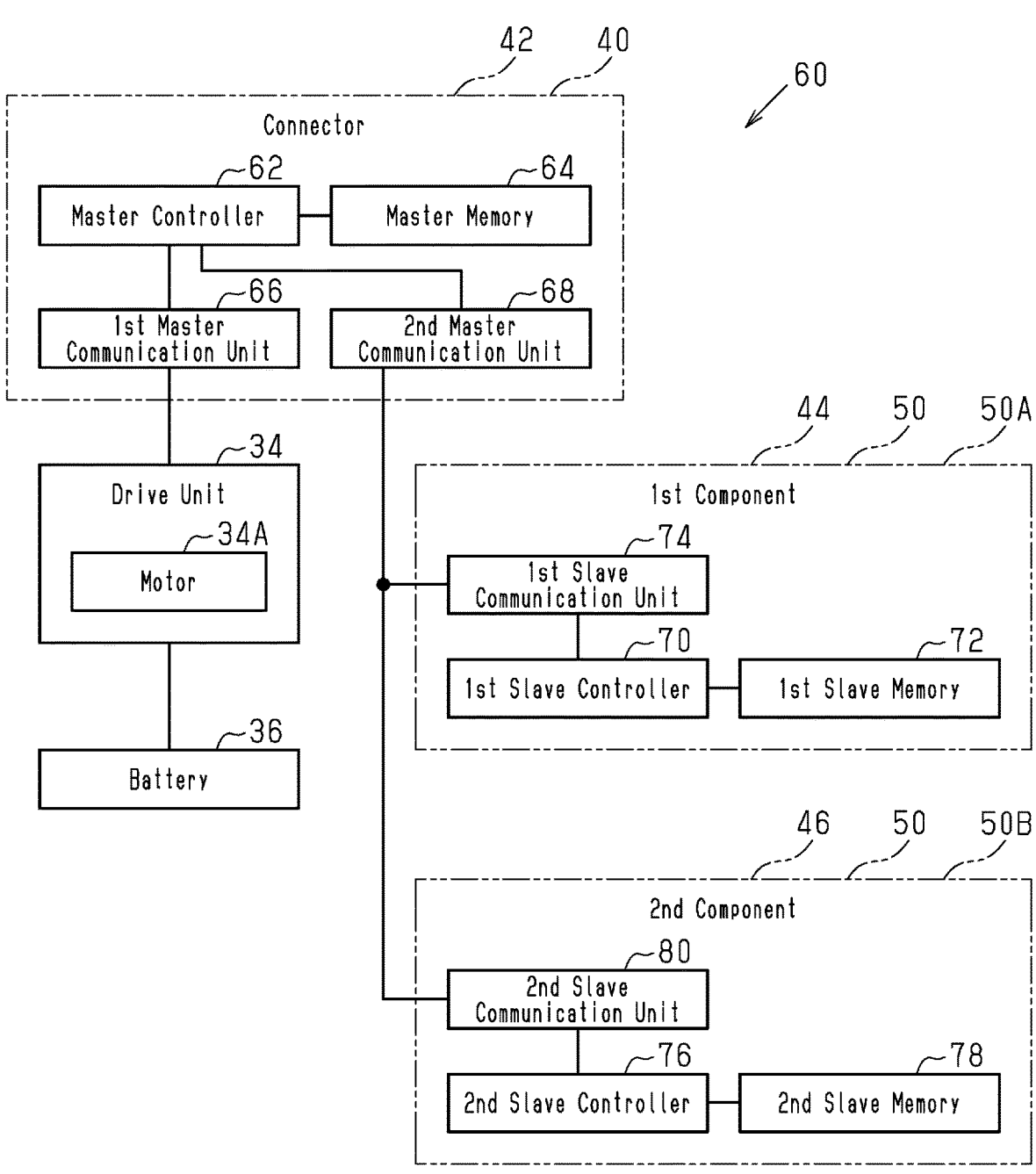
FIG. 2 is a block diagram showing the electrical configuration of the human-powered vehicle illustrated in FIG. 1.

As shown by FIGS. 1 and 2, the human-powered vehicle 10 includes a drive unit 34. The drive unit 34 includes a motor 34A that applies a propulsion force to the human-powered vehicle 10. The motor 34A is, for example, a brushless motor. The motor 34A is configured to transmit rotational force to at least one of the front wheel 14B and a power transmission path of human driving force extending from the pedals 26A and 26B to the rear wheel 14A. The power transmission path of human driving force extending from the pedals 26A and 26B to the rear wheel 14A includes the rear wheel 14A. In the present embodiment, the motor 34A is provided on the frame 18 of the human-powered vehicle 10 and configured to transmit rotational force to the first rotational body 30.

The drive unit 34 further includes a housing 34B. The motor 34A is provided in the housing 34B of the drive unit 34. The housing 34B is provided on the frame 18. The housing 34B is, for example, attached in a removable manner to the frame 18. The drive unit 34 can include a speed reducer connected to the output shaft of the motor 34A. In the present embodiment, the housing 34B rotatably supports the input shaft 12A. Preferably, in the present embodiment, a third one-way clutch is provided in a power transmission path between the motor 34A and the input shaft 12A to restrict transmission of the rotational force of the crank 12 to the motor 34A in a case where the input shaft 12A is rotated in a direction that moves the human-powered vehicle 10 forward. In a case where the motor 34A is provided on at least one of the rear wheel 14A and the front wheel 14B, the motor 34A can be provided on a hub to form a hub motor with the hub.

In one example, the drive unit 34 includes an electronic controller. The electronic controller includes a processor that executes a predetermined control program. The processor of the electronic controller includes, for example, a central processing unit (CPU) or a micro-processing unit (MPU). The processor of the electronic controller can be arranged at separate locations. The controller can include one or more microcomputers. The terms "controller" and "electronic controller" as used herein refer to hardware that executes a software program, and does not include a human being.

In one example, the electronic controller includes storage. The storage stores predetermined control programs and information used for control processes. The storage includes, for example, a nonvolatile memory and a volatile memory. The term "storage" as used herein refers to any computer storage device or any non-transitory computer-readable medium with the sole exception of a transitory, propagating signal. In other words, the term "storage" as used herein refers to a non-transitory computer readable storage. The nonvolatile memory includes, for example, at least one of a read-only memory (ROM), an erasable programmable read-only memory (EPROM), an electrically erasable programmable read-only memory (EEPROM), and a flash memory. The volatile memory includes, for example, a random access memory (RAM).

In one example, the human-powered vehicle 10 further includes a battery 36. In one example, the battery 36 is a battery. The battery 36 includes one or more battery elements. The battery elements include rechargeable batteries. In one example, the battery 36 is configured to supply the controller of the drive unit 34 with electric power. In one example, the battery 36 performs communication with the drive unit 34 through wire-connection or wireless connection. For example, the battery 36 is connected through Power Line Communication (PLC), Controller Area Network (CAN), or Universal Asynchronous Receiver-Transmitter (UART) to the drive unit 34 in a manner allowing for communication.

In one example, the human-powered vehicle 10 includes a control system for a human-powered vehicle. The control system for a human-powered vehicle includes the component 40 for a human-powered vehicle, a first component 44, and a second component 46. In one example, the component 40 for a human-powered vehicle includes the human-powered vehicle control device 60. In one example, the component 40 for a human-powered vehicle includes at least part of the human-powered vehicle control device 60. In one example, the first component 44 and the second component 46 are configured to be supplied with electric power from the battery 36 via the drive unit 34. In one example, the component 40 for a human-powered vehicle connects the drive unit 34, the first component 44, and the second component 46 in a manner allowing for communication. In one example, the component 40 includes a connector 42 that connects the drive unit 34, the first component 44, and the second component 46 in a manner allowing for communication. In one example, the first component 44 and the second component 46 are configured to be supplied with electric power from the battery 36 via the drive unit 34 including the motor 34A that applies a propulsion force to the human-powered vehicle 10.

In one example, the connector 42 is configured to be connectable to the drive unit 34 by a first electric cable. In one example, the first electric cable is coupled in a removable manner to the connector 42. In one example, the connector 42 is configured to be connectable to the first component 44 and the second component 46 by a second electric cable. In one example, the second electric cable is coupled in a removable manner to the connector 42.

In one example, at least one of the first component 44 and the second component 46 includes a transmission device 50. In the present embodiment, the first component 44 includes the transmission device 50, and the second component 46 includes the transmission device 50.

In one example, the transmission device 50 is provided in a transmission path of human driving force of the human-powered vehicle 10 and configured to shift the transmission ratio. The transmission device 50 includes a plurality of shift stages. Each shift stage corresponds to a different transmission ratio. The number of shift stages is, for example, three to thirty. The transmission ratio is the ratio of the rotational speed of the drive wheel to the rotational speed of the input shaft 12A. In the present embodiment, the drive wheel is the rear wheel 14A.

In one example, the transmission device 50 includes at least one of a first transmission device 50A and a second transmission device 50B. In one example, the second transmission device 50B is provided in the transmission path of human driving force closer to the drive wheel than the first transmission device 50A. In one example, the first transmission device 50A is provided in the vicinity of the crank 12, and the second transmission device 50B is provided in the vicinity of the drive wheel.

The transmission device 50 includes, for example, at least one of a derailleur and an internal-gear hub. In a case where the transmission device 50 includes an internal-gear hub, for example, the internal-gear hub is provided on the hub of the rear wheel 14A. The internal-gear hub can include a continuously variable transmission (CVT).

In a case where the first transmission device 50A includes a derailleur, for example, the first transmission device 50A includes a front derailleur. In a case where the second transmission device 50B includes a derailleur, for example, the second transmission device 50B includes a rear derailleur. In a case where the first transmission device 50A includes a front derailleur, the first transmission device 50A includes the first rotational body 30, and the first rotational body 30 includes front sprockets. In a case where the second transmission device 50B includes a rear derailleur, the second transmission device 50B includes the second rotational body 32, and the second rotational body 32 includes rear sprockets. The transmission device 50 includes an electric transmission configured to be actuated by an actuator. The actuator includes an electric actuator. The actuator includes, for example, an electric motor. The relationship of the transmission ratio, the rotational speed of the drive wheel, and the rotational speed of the input shaft 12A is expressed by equation (1).

$$\text{Transmission Ratio} = \text{Rotational Speed of Drive Wheel} / \text{Rotational Speed of Input Shaft} \qquad \text{Equation (1):}$$

The rotational speed of the drive wheel and the rotational speed of the input shaft 12A can each be the number of rotations per unit time. The rotational speed of the drive wheel can be replaced by the number of teeth of the front sprocket, and the rotational speed of the input shaft 12A can be replaced by the number of teeth of the rear sprocket.

In one example, one of the first component 44 and the second component 46 includes the first transmission device 50A, and the other one of the first component 44 and the second component 46 includes the second transmission device 50B. In one example, one of the first component 44 and the second component 46 includes a front derailleur, and the other one of the first component 44 and the second component 46 includes a rear derailleur. One of the first component 44 and the second component 46 can include a derailleur, and the other one of the first component 44 and the second component 46 can include an internal-gear hub. In the present embodiment, the first component 44 includes the first transmission device 50A, and the second component 46 includes the second transmission device 50B. In the present embodiment, the first component 44 includes a front derailleur, and the second component 46 includes a rear derailleur.

The component 40 is separate from the drive unit 34. For example, the component 40 is provided in a manner independent of the drive unit 34. In one example, the component 40 performs power line communication (PLC) with the first component 44 and the second component 46. The component 40 can be configured to perform CAN communication with the first component 44 and the second component 46.

In one example, the component 40 is configured to supply electric power to the first component 44 and the second component 46. The first component 44 and the second component 46 can be connected parallel to the component 40. In one example, the component 40 is configured to receive electric power from the battery 36. In one example, the component 40 is configured to receive electric power via the drive unit 34 from the battery 36.

In one example, the component 40 performs communication with the first component 44 and the second component 46 in compliance with a first communication protocol. In one example, the component 40 performs communication with the drive unit 34 in compliance with a second communication protocol. The first communication protocol can differ from the second communication protocol or be the same as the second communication protocol. In one example, the first communication protocol is one of power line communication (PLC), CAN, and UART. In one example, the second communication protocol is one of power line communication (PLC), CAN, and UART.

The human-powered vehicle control device 60 includes a master controller 62. The master controller 62 can also be referred to as master electronic controller. The terms "master controller" and "master electronic controller" as used herein refer to hardware that executes a software program, and does not include a human being. In one example, the master controller 62 is provided in the component 40 for a human-powered vehicle. In one example, the master controller 62 is provided in the housing of the component 40. The master controller 62 includes at least one processor (at least one master processor) that executes predetermined control programs. The master controller 62 includes, for example, a CPU or an MPU. When the master controller 62 includes more than one processor, the processors of the master controller 62 can be provided at separate locations. Thus, e master controller 62 can include one or more microcomputers.

In one example, the human-powered vehicle control device 60 further includes a master memory 64. In one example, the master memory 64 is provided in the component 40 for a human-powered vehicle. In one example, the master memory 64 is provided in the housing of the component 40. The master memory 64 stores predetermined control programs and information used for control processes. The master memory 64 includes, for example, a nonvolatile memory and a volatile memory. The nonvolatile memory includes, for example, at least one of a ROM, an EPROM, an EEPROM, and a flash memory. The volatile memory includes, for example, a RAM. Thus, the term "master memory" as used herein refers to any computer storage device or any non-transitory computer-readable medium with the sole exception of a transitory, propagating signal. In other words, the term "master memory" as used herein refers to a non-transitory computer readable memory.

In one example, the human-powered vehicle control device 60 includes a first master communication unit 66. In one example, the first master communication unit 66 is provided in the component 40 for a human-powered vehicle. For example, the first master communication unit 66 is provided in the housing of the component 40. The first master communication unit 66 transmits and receives signals complying with the first communication protocol. The first master communication unit 66 can also be referred to as a first master communication device or a first master communicator. In any case, the terms "master communication unit", "master communication device" and "master communicator" as used herein refer to hardware that is configured to transmit and receive signals, and does not include a human being.

In one example, the human-powered vehicle control device 60 further includes a second master communication unit 68. In one example, the second master communication unit 68 is provided in the component 40 for a human-powered vehicle. For example, the second master communication unit 68 is provided in the housing of the component 40. The second master communication unit 68 transmits and receives signals complying with the second communication protocol. The second master communication unit 68 can also be referred to as a second master communication device or a second master communicator.

In one example, the human-powered vehicle control device 60 further includes a first slave controller 70. The first slave controller 70 can also be referred to as first slave electronic controller. The terms "slave controller" and "slave electronic controller" as used herein refer to hardware that executes a software program, and does not include a human being. In one example, the first slave controller 70 is provided in the first component 44. For example, the first slave controller 70 is provided in the housing of the first component 44. The first slave controller 70 includes at least one processors that executes predetermined control programs. The processor of the first slave controller 70 includes, for example, a CPU or an MPU. When the first slave controller 70 includes more than one processor, the processors of the first slave controller 70 can be provided at separate locations. The first slave controller 70 can include one or more microcomputers.

In one example, the human-powered vehicle control device 60 further includes a first slave memory 72. In one example, the first slave memory 72 is provided in the first component 44. For example, the first slave memory 72 is provided in the housing of the first component 44. The first slave memory 72 stores predetermined control programs and information used for control processes. The first slave memory 72 includes, for example, a nonvolatile memory and a volatile memory. The nonvolatile memory includes, for example, at least one of a ROM, an EPROM, an EEPROM, and a flash memory. The volatile memory includes, for example, a RAM. Thus, the term "slave memory" as used herein refers to any computer storage device or any non-transitory computer-readable medium with the sole exception of a transitory, propagating signal. In other words, the term "slave memory" as used herein refers to a non-transitory computer readable memory.

In one example, the human-powered vehicle control device 60 further includes a first slave communication unit 74. In one example, the first slave communication unit 74 is provided in the first component 44. For example, the first slave communication unit 74 is provided in the housing of the first component 44. The first slave communication unit 74 transmits signals to and receives signals from the second master communication unit 68 in compliance with the second communication protocol. The first slave communication unit 74 can also be referred to as a first slave communication device or a first slave communicator. In any case, the terms "slave communication unit", "slave communication device" and "slave communicator" as used herein refer to hardware that is configured to transmit and receive signals, and does not include a human being.

In one example, the human-powered vehicle control device 60 further includes a second slave controller 76. The second slave controller 76 can also be referred to as second slave electronic controller. In one example, the second slave controller 76 is provided in the second component 46. For example, the second slave controller 76 is provided in the housing of the second component 46. The second slave controller 76 includes at least one processors that executes predetermined control programs. The processor of the second slave controller 76 includes, for example, a CPU or an MPU. When the first slave controller 70 includes more than one processor, the processors of the second slave controller 76 can be provided at separate locations. The second slave controller 76 can include one or more microcomputers.

In one example, the human-powered vehicle control device 60 further includes a second slave memory 78. In one example, the second slave memory 78 is provided in the second component 46. For example, the second slave memory 78 is provided in the housing of the second component 46. The second slave memory 78 stores predetermined control programs and information used for control processes. The second slave memory 78 includes, for example, a nonvolatile memory and a volatile memory. The nonvolatile memory includes, for example, at least one of a ROM, an EPROM, an EEPROM, and a flash memory. The volatile memory includes, for example, a RAM.

In one example, the human-powered vehicle control device 60 further includes a second slave communication unit 80. In one example, the second slave communication unit 80 is provided in the second component 46. In one example, the second slave communication unit 80 is provided in the housing of the second component 46. The second slave communication unit 80 transmits signals to and receives signals from the second master communication unit 68 in compliance with the second communication protocol. The second slave communication unit 80 can also be referred to as a second slave communication device or a second slave communicator.

The master controller 62 is configured to control the first component 44 and the second component 46. The first component 44 is configured to be controlled by at least one of the master controller 62 and the first slave controller 70. In a case where the first component 44 is controlled by the first slave controller 70, the master controller 62 is configured to restrict operation of at least one of the first component 44 and the second component 46 based on a first operation signal transmitted from the first slave controller 70.

A case where the first component 44 is controlled by the first slave controller 70 is, for example, a case where the first slave controller 70 determines that a first component operation condition is satisfied. For example, in a case where the first component 44 is controlled by the first slave controller 70, the master controller 62 is configured to determine whether to restrict operation of the first component 44 before the first component 44 initiates an operation.

In one example, the first slave controller 70 is configured to be autonomously controllable. In one example, the second slave controller 76 is configured to be autonomously controllable. Autonomous control is control based on determination of whether the first component operation condition is satisfied and does not rely on control signals from the master controller 62, operating devices, and the like. In one example, the autonomous control of the first slave controller 70 includes control for adjusting the first component 44. In one example, the autonomous control of the second slave controller 76 includes control for adjusting the second component 46.

In one example, operation restriction of the first component 44 and the second component 46 includes at least one of delay and prohibition of operation initiation. In one example, the master controller 62 is configured to control the first component 44 and the second component 46 so that the first component 44 and the second component 46 do not operate simultaneously. For example, the master controller 62 is configured to control operation of the first component 44 and the second component 46 so that the sum of the electric power consumed by operation of the first component 44 and the electric power consumed by operation of the second component 46 is less than or equal to a predetermined electric power.

In one example, operation of the first component 44 corresponds to driving of an electric actuator included in the first component 44. In one example, operation of the second component 46 corresponds to driving of an electric actuator included in the second component 46. In one example, in a case where the first component 44 includes a derailleur, operation of the first component 44 includes an operation for adjusting the position of the derailleur. In one example, in a case where the second component 46 includes a derailleur, operation of the second component 46 includes an operation for adjusting the position of the derailleur.

In one example, the master controller 62 is configured to permit operation of the second component 46 in a case where the first component 44 is operated by the first slave controller 70 and the first component 44 completes an operation or in a case where the first component 44 is operated by the first slave controller 70 and a first period elapses after the first component 44 initiates an operation. In one example, the first period is set in accordance with the period required for the first component 44 to complete an operation.

In one example, the first slave controller 70 transmits a first completion signal to the master controller 62 in a case where the first component 44 completes an operation. The master controller 62 is configured to permit operation of the second component 46 based on the first completion signal.

In one example, the second component 46 is configured to be controlled by at least one of the master controller 62 and the second slave controller 76. In a case where the second component 46 is controlled by the second slave controller 76, the master controller 62 restricts operation of at least one of the first component 44 and the second component 46 based on a second operation signal transmitted from the second slave controller 76.

A case where the second component 46 is controlled by the second slave controller 76 is, for example, a case where the second slave controller 76 determines that a second component operation condition is satisfied. For example, in a case where the second component 46 is controlled by the second slave controller 76, the master controller 62 is configured to determine whether to restrict operation of the second component 46 before the second component 46 initiates an operation.

In one example, the master controller 62 is configured to permit operation of the first component 44 in a case where the second component 46 is operated by the second slave controller 76 and the second component 46 completes an operation or in a case where the second component 46 is operated by the second slave controller 76 and a second period elapses after the second component 46 initiates an operation. In one example, the second period is set in accordance with the period required for the second component 46 to complete an operation.

In one example, the second slave controller 76 transmits a second completion signal to the master controller 62 in a case where the second component 46 completes an operation. The master controller 62 is configured to permit operation of the first component 44 based on the second completion signal.

In one example, the master controller 62 is configured to transmit a second component restriction signal that restricts initiation of operation of the second component 46 to the second slave controller 76 in order to restrict operation of the second component 46.

In one example, the second slave controller 76 is configured to control the second component 46 so that the second component 46 initiates operation in a case where the second component operation condition for initiating operation of the second component 46 is satisfied and the second component restriction signal is not received from the master controller 62.

In one example, the second slave controller 76 is configured to control the second component 46 so that the second component 46 does not initiate an operation in a case where the second component operation condition is satisfied and the second component restriction signal is received from the master controller 62.

In one example, the master controller 62 is configured to transmit a first component restriction signal that restricts initiation of operation of the first component 44 to the first slave controller 70 to restrict operation of the first component 44.

In one example, the first slave controller 70 is configured to control the first component 44 so that the first component 44 initiates operation in a case where the first component operation condition for initiating operation of the first component 44 is satisfied and the first component restriction signal is not received from the master controller 62.

In one example, the first slave controller 70 is configured to control the first component 44 so that the first component 44 does not initiate operation in a case where the first component operation condition is satisfied and the first component restriction signal is received from the master controller 62.

In one example, the first slave controller 70 is configured to switch a control state between a first control state and a second control state. In a case where the control state is the first control state, the first slave controller 70 is configured to transmit the first operation signal to the master controller 62 if the first component operation condition is satisfied. In a case where the control state is the second control state, the first slave controller 70 is configured to control the first component 44 so that the first component 44 initiates operation, without transmitting the first operation signal to the master controller 62, if the first component operation condition is satisfied.

In one example, the master controller 62 is configured to transmit a switch signal to the first slave controller 70 to switch the control state of the first slave controller 70 between the first control state and the second control state. The first slave controller 70 is configured to switch the control state between the first control state and the second control state based on the switch signal.

Figure 3:
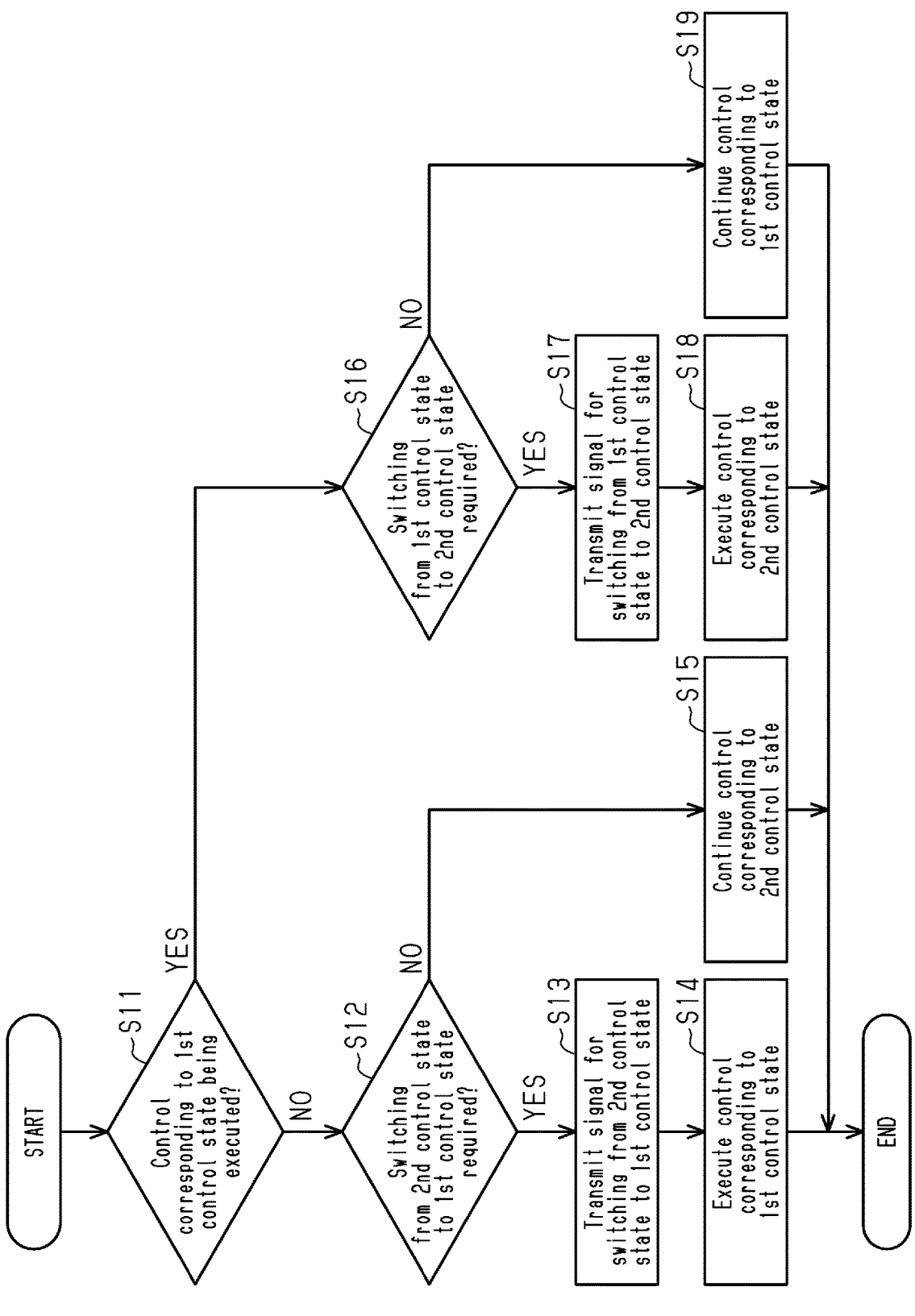
FIG. 3 is a flowchart of a process executed by a master controller illustrated in FIG. 2 to switch a control state between a first control state and a second control state.

With reference to FIG. 3, a process executed by the master controller 62 to switch the control state between the first control state and the second control state will now be described. In a case where, for example, the master controller 62 is supplied with electric power, the master controller 62 starts the process from step S11 of the flowchart illustrated in FIG. 3. Upon completion of the flowchart illustrated in FIG. 3, the master controller 62 repeats the process from step S11 of FIG. 3 in predetermined cycles until, for example, the supply of electric power is stopped.

In step S11, the master controller 62 determines whether control corresponding to the first control state is being executed. For example, the master controller 62 determines that control corresponding to the first control state is being executed in a case where the first component 44 and the second component 46 is in the first control state. For example, the master controller 62 determines that control corresponding to the first control state is being executed in a case where the first component 44 and the second component 46 are being controlled to be in the first control state. The master controller 62 proceeds to step S12 in a case where control corresponding to the first control state is not being executed.

In step S12, the master controller 62 determines whether switching from the second control state to the first control state is required. For example, the master controller 62 determines that switching from the second control state to the first control state is required based on at least one of an operation signal from an operating device provided on the human-powered vehicle 10 and a signal from an external device. For example, the master controller 62 determines that switching from the second control state to the first control state is required based on the voltage level of the battery 36. In a case where switching from the second control state to the first control state is required, the master controller 62 proceeds to step S13.

In step S13, the master controller 62 transmits a switch signal for switching from the second control state to the first control state and then proceeds to step S14. For example, the master controller 62 transmits a switch signal to the first slave controller 70 and the second slave controller 76 to switch from the second control state to the first control state.

In step S14, the master controller 62 executes control corresponding to the first control state and then ends the process. From step S14, the master controller 62 is configured to control the first component 44 and the second component 46 so as to restrict simultaneous operation of the first component 44 and the second component 46.

In a case where switching from the second control state to the first control state is not required in step S12, the master controller 62 proceeds to step S15. In step S15, the master controller 62 continues the control corresponding to the second control state and then ends the process. From step S15, the master controller 62 is configured to control the first component 44 and the second component 46 so as not to restrict simultaneous operation of the first component 44 and the second component 46.

In a case where control corresponding to the first control state is being executed in step S11, the master controller 62 proceeds to step S16. In step S16, the master controller 62 determines whether switching from the first control state to the second control state is required. For example, the master controller 62 determines that switching from the first control state to the second control state is required based on at least one of an operation signal from the operating device provided on the human-powered vehicle 10 and a signal from the external device. For example, the master controller 62 determines that switching from the first control state to the second control state is required based on the voltage level of the battery 36. In a case where switching from the first control state to the second control state is required, the master controller 62 proceeds to step S17.

In step S17, the master controller 62 transmits a switch signal for switching from the first control state to the second control state and then proceeds to step S18. For example, the master controller 62 transmits a switch signal to the first slave controller 70 and the second slave controller 76 to switch from the first control state to the second control state.

In step S18, the master controller 62 executes control corresponding to the second control state and then ends the process. From step S18, the master controller 62 is configured to control the first component 44 and the second component 46 so as not to restrict simultaneous operation of the first component 44 and the second component 46.

In a case where switching from the first control state to the second control state is not required in step S16, the master controller 62 proceeds to step S19. In step S19, the master controller 62 continues the control corresponding to the first control state and then ends the process. From step S19, the master controller 62 is configured to control the first component 44 and the second component 46 so as to restrict simultaneous operation of the first component 44 and the second component 46.

Figure 4:
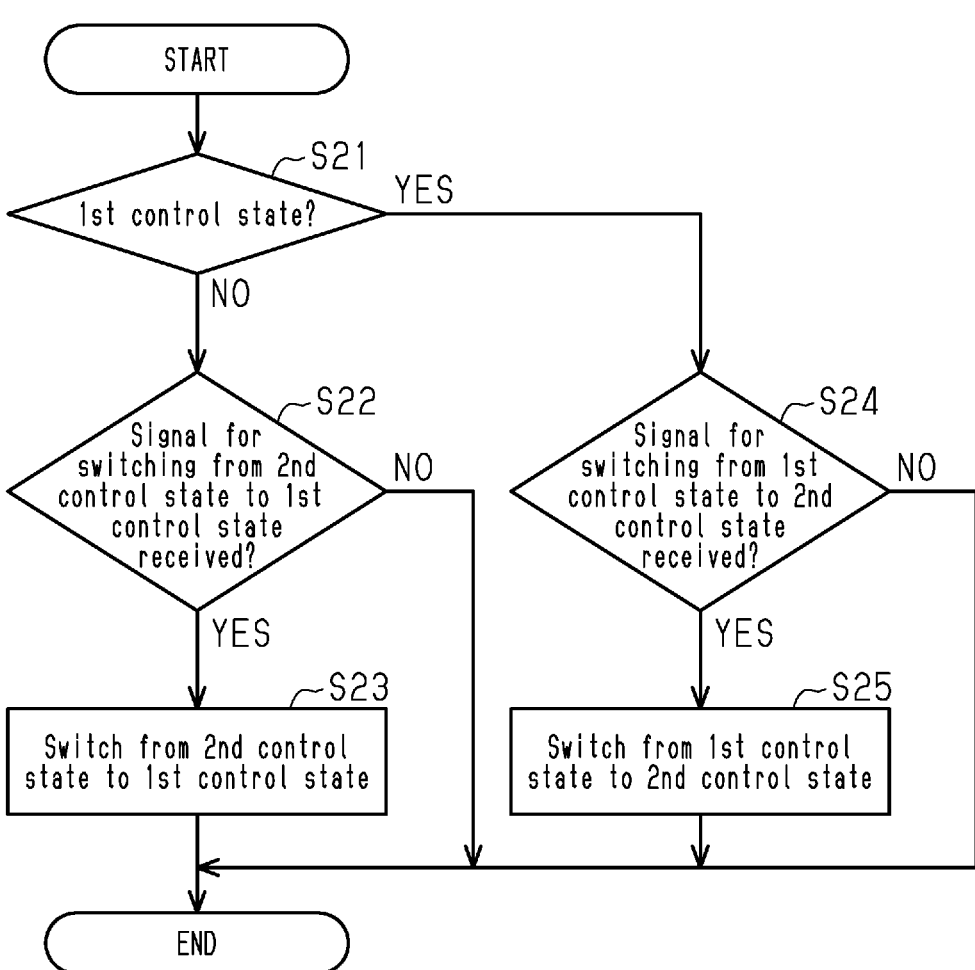
FIG. 4 is a flowchart of a process executed by a first slave controller illustrated in FIG. 2 to switch the control state between the first control state and the second control state.

With reference to FIG. 4, a process executed by the first slave controller 70 to switch the control state between the first control state and the second control state will now be described. In a case where, for example, the first slave controller 70 is supplied with electric power, the first slave controller 70 starts the process from step S21 of the flow-chart illustrated in FIG. 4. Upon completion of the flowchart illustrated in FIG. 4, the first slave controller 70 repeats the process from step S21 of FIG. 4 in predetermined cycles until, for example, the supply of electric power is stopped.

In step S21, the first slave controller 70 determines whether the control state is the first control state. The first slave controller 70 proceeds to step S22 in a case where the control state is not the first control state.

In step S22, the first slave controller 70 determines whether a switch signal for switching from the second control state to the first control state has been received. For example, the first slave controller 70 determines that a switch signal for switching from the second control state to the first control state has been received in a case where the switch signal transmitted from the master controller 62 in step S13 of FIG. 3 is received. In a case where a switch signal for switching from the second control state to the first control state is not received, the first slave controller 70 ends the process. In a case where a switch signal for switching from the second control state to the first control state is received, the first slave controller 70 proceeds to step S23.

In step S23, the first slave controller 70 switches from the second control state to the first control state and then ends the process. From step S23, the first slave controller 70 can control the first component 44 without performing communication with the master controller 62.

In a case where the control state is the first control state in step S21, the first slave controller 70 proceeds to step S24.

In step S24, the first slave controller 70 determines whether a switch signal for switching from the first control state to the second control state has been received. For example, the first slave controller 70 determines that a switch signal for switching from the first control state to the second control state has been received in a case where the switch signal transmitted from the master controller 62 in step S17 of FIG. 3 is received. In a case where a switch signal for switching from the first control state to the second control state is not received, the first slave controller 70 ends the process. In a case where a switch signal for switching from the first control state to the second control state is received, the first slave controller 70 proceeds to step S25.

In step S25, the first slave controller 70 switches from the first control state to the second control state and then ends the process. From step S25, to operate the first component 44, the first slave controller 70 operates the first component 44 through communication with the master controller 62.

The second slave controller 76 executes a process for switching the control state between the first control state and the second control state in the same manner as the flowchart illustrated in FIG. 4. The process executed by the second slave controller 76 to switch between the first control state and the second control state can be illustrated with the flowchart of FIG. 4 by replacing the first slave controller 70 with the second slave controller 76 and replacing the first component 44 with the second component 46.

Figure 5:
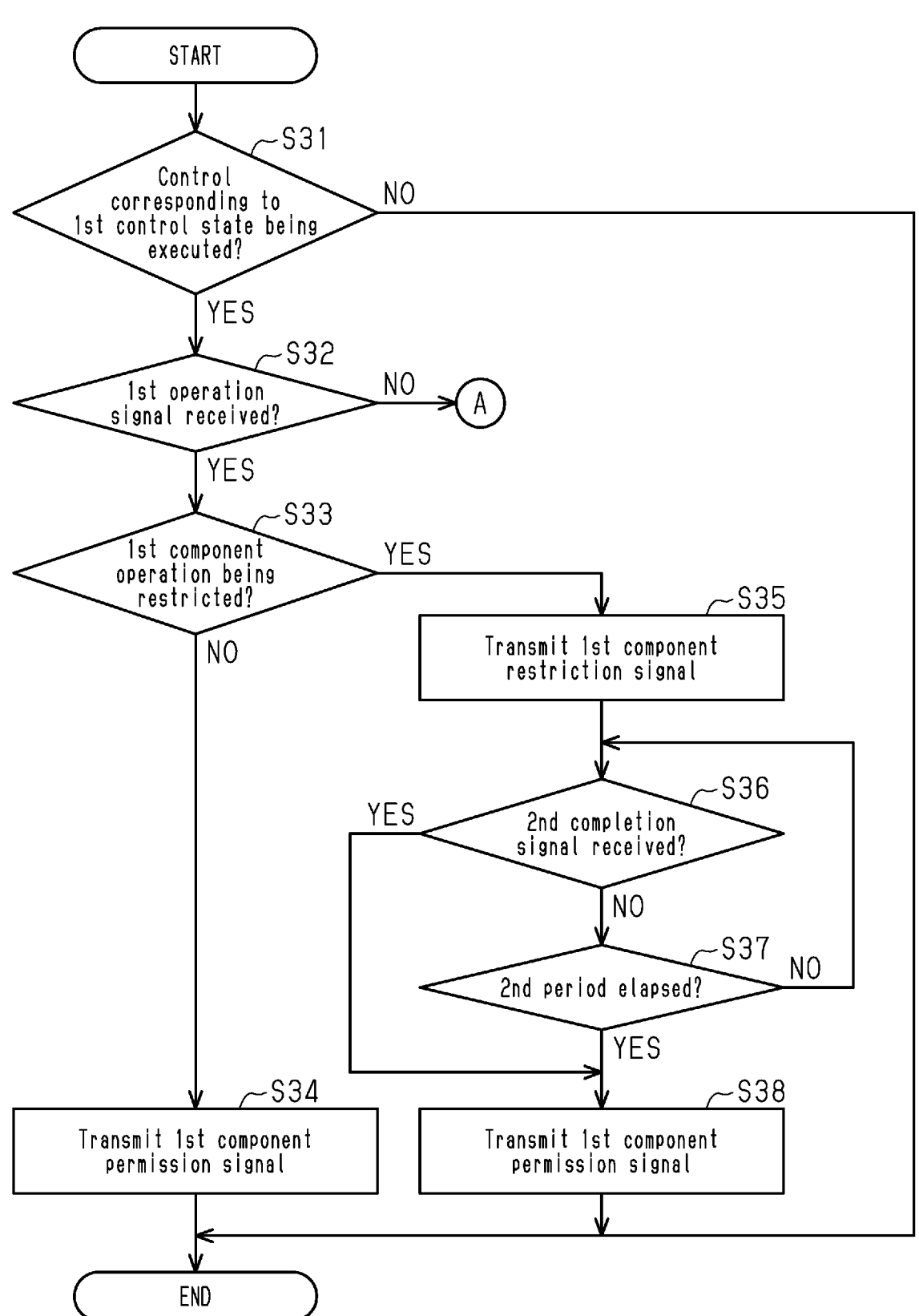
FIG. 5 is a flowchart showing a first part of a process for controlling a first component and a second component executed by the master controller illustrated in FIG. 2.
Figure 6:
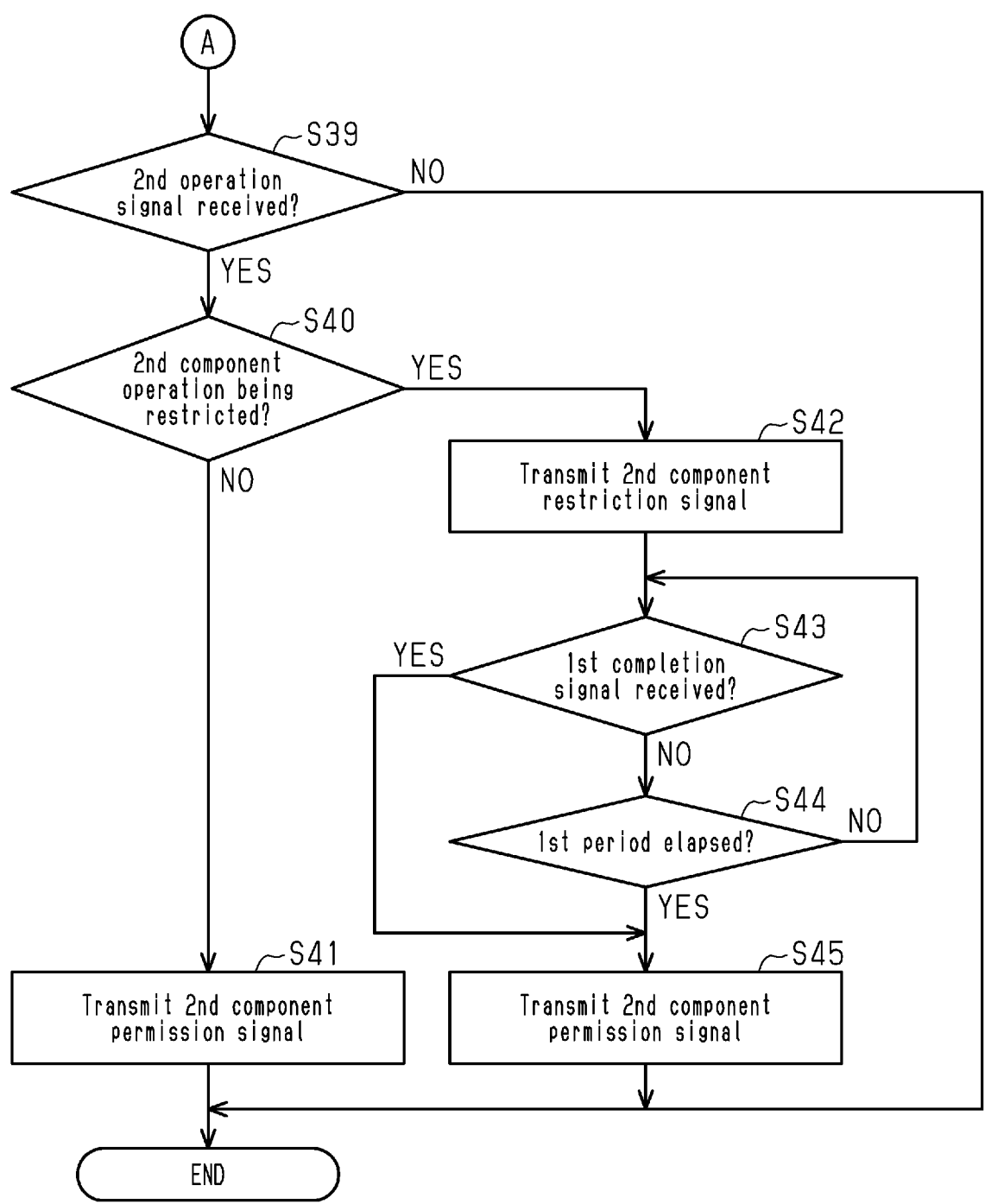
FIG. 6 is a flowchart showing a second part of the process for controlling the first component and the second component executed by the master controller illustrated in FIG. 2.

With reference to FIGS. 5 and 6, a process executed by the master controller 62 in the first control state to control the first component 44 and the second component 46 will now be described. In a case where, for example, the master controller 62 is supplied with electric power, the master controller 62 starts the process from step S31 of the flow-chart illustrated in FIG. 5. Upon completion of the flowchart illustrated in FIGS. 5 and 6, the master controller 62 repeats the process from step S31 of FIG. 5 in predetermined cycles until, for example, the supply of electric power is stopped.

In step S31, the master controller 62 determines whether control corresponding to the first control state is being executed. The master controller 62 ends the process in a case where control corresponding to the first control state is not being executed. The master controller 62 proceeds to step S32 in a case where control corresponding to the first control state is being executed.

In step S32, the master controller 62 determines whether a first operation signal has been received. The master controller 62 proceeds to step S33 in a case where the first operation signal has been received. In step S33, the master controller 62 determines whether a first component opera-tion is being restricted. For example, the master controller 62 determines that a first component operation is being restricted in a case whether a second operation signal has been received from the second component 46, a second completion signal has not been received from the second component 46, and a second period has not elapsed from when the second operation signal was received. In a case where the first component operation is not being restricted, the master controller 62 proceeds to step S34. In step S34, the master controller 62 transmits a first component permis-sion signal and then ends the process.

In a case where the first component operation is being restricted in step S33, the master controller 62 proceeds to step S35. In step S35, the master controller 62 transmits a first component restriction signal and then proceeds to step S36.

In step S36, the master controller 62 determines whether a second completion signal has been received. The master controller 62 proceeds to step S38 in a case where the second completion signal has been received. The master controller 62 proceeds to step S37 in a case where the second comple-tion signal has not been received. In step S37, the master controller 62 determines whether the second period has elapsed. The master controller 62 proceeds to step S36 in a case where the second period has not elapsed. The master controller 62 proceeds to step S38 in a case where the second period has elapsed.

The order of step S36 and step S37 can be reversed. One of step S36 and step S37 can be omitted. In a case where one of step S36 and step S37 is omitted, the master controller 62 proceeds to step S38 if the other one of step S36 and step S37 is YES. In a case where one of step S36 and step S37 is omitted, the master controller 62 repeats the other one of step S36 and step S37 if the other one of step S36 and step S37 is NO.

In step S38, the master controller 62 transmits the first component permission signal and then ends the process.

The master controller 62 proceeds to step S39 in a case where the first operation signal is not received in step S32. In step S39, the master controller 62 determines whether a second operation signal has been received. The master controller 62 proceeds to step S40 in a case where the second operation signal has been received. In step S40, the master controller 62 determines whether a second component operation is being restricted. For example, the master con-troller 62 determines that a second component operation is being restricted in a case whether a first operation signal has been received from the first component 44, a first completion signal has not been received from the first component 44, and a first period has not elapsed from when the first operation signal was received. In a case where the second component operation is not being restricted, the master controller 62 proceeds to step S41. In step S41, the master controller 62 transmits a second component permission signal and then ends the process.

In a case where the second component operation is being restricted in step S40, the master controller 62 proceeds to step S42. In step S42, the master controller 62 transmits a second component restriction signal and then proceeds to step S43.

In step S43, the master controller 62 determines whether a first completion signal has been received. The master controller 62 proceeds to step S45 in a case where the first completion signal has been received. The master controller 62 proceeds to step S44 in a case where the first completion signal has not been received. In step S44, the master controller 62 determines whether the first period has elapsed. The master controller 62 proceeds to step S43 in a case where the first period has not elapsed. The master controller 62 proceeds to step S45 in a case where the first period has elapsed.

The order of step S43 and step S44 can be reversed. One of step S43 and step S44 can be omitted. In a case where one of step S43 and step S44 is omitted, the master controller 62 proceeds to step S45 if the other one of step S43 and step S44 is YES. In a case where one of step S43 and step S44 is omitted, the master controller 62 repeats the other one of step S43 and step S44 if the other one of step S43 and step S44 is NO.

In step S45, the master controller 62 transmits the second component permission signal and then ends the process.

Figure 7:
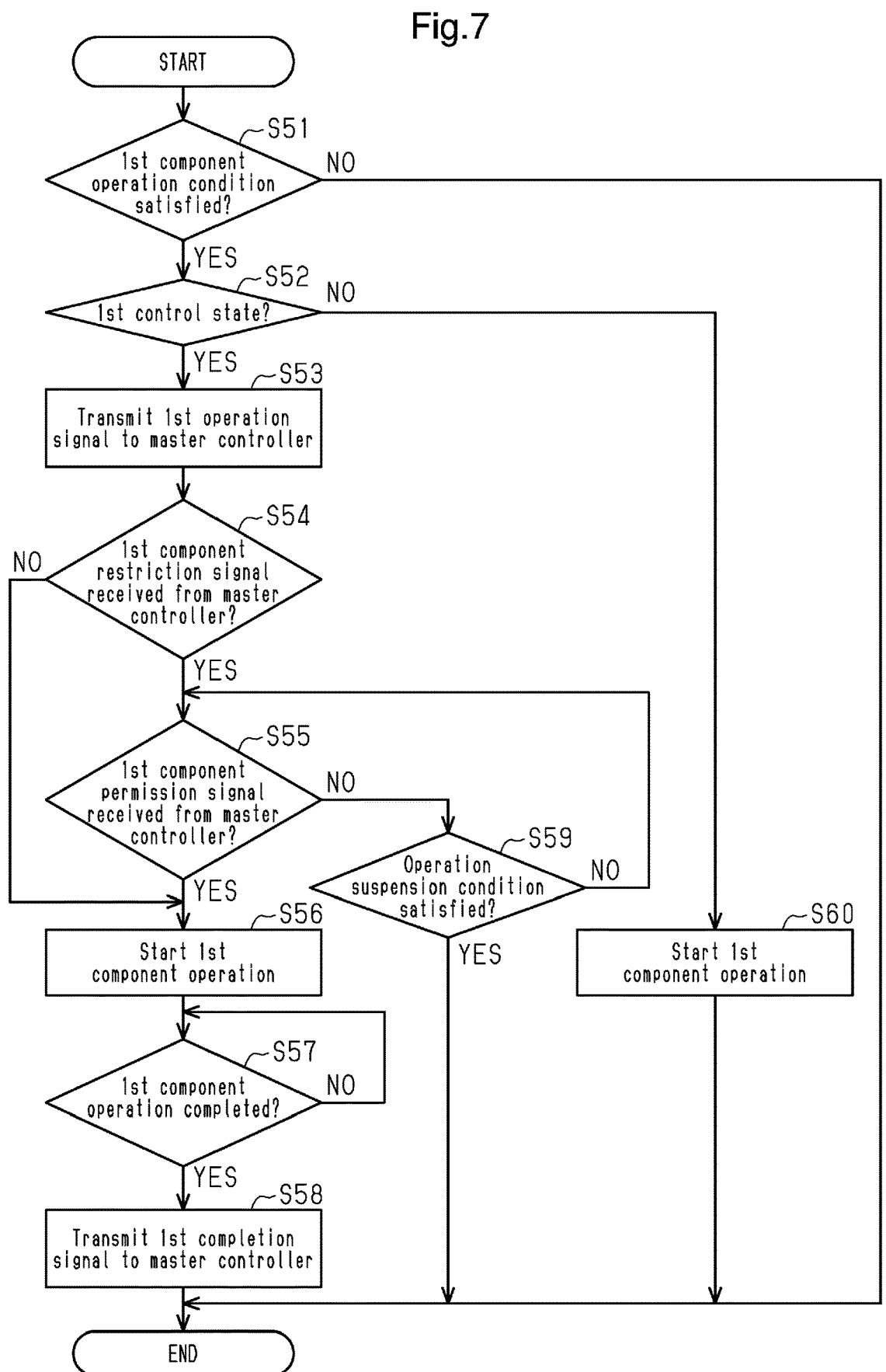
FIG. 7 is a flowchart showing a process for controlling the first component executed by the first slave controller illustrated in FIG. 2.

With reference to FIG. 7, a process executed by the first slave controller 70 to control the first component 44 will now be described. In a case where, for example, the first slave controller 70 is supplied with electric power, the first slave controller 70 starts the process from step S51 of the flowchart illustrated in FIG. 7. Upon completion of the flowchart illustrated in FIG. 7, the first slave controller 70 repeats the process from step S51 of FIG. 7 in predetermined cycles until, for example, the supply of electric power is stopped.

In step S51, the first slave controller 70 determines whether the first component operation condition is satisfied. In a case where the first component operation condition is not satisfied, the first slave controller 70 ends the process. In a case where the first component operation condition is satisfied, the first slave controller 70 proceeds to step S52.

In step S52, the first slave controller 70 determines whether the control state is the first control state. In a case where the control state is the first control state, the first slave controller 70 proceeds to step S53. In step S53, the first slave controller 70 transmits a first operation signal to the master controller 62 and then proceeds to step S54.

In step S54, the first slave controller 70 determines whether a first component restriction signal has been received from the master controller 62. In a case where the first component restriction signal has not been received from the master controller 62, the first slave controller 70 proceeds to step S56. In a case where a first component restriction signal has been received from the master controller 62, the first slave controller 70 proceeds to step S55.

In step S55, the first slave controller 70 determines whether a first component permission signal has been received from the master controller 62. In a case where the first component permission signal has been received from the master controller 62, the first slave controller 70 proceeds to step S56.

In step S56, the first slave controller 70 initiates operation of the first component 44 and then proceeds to step S57. In step S57, the first slave controller 70 determines whether operation of the first component 44 has been completed. In a case where operation of the first component 44 has not been completed, the first slave controller 70 performs step S57 again. In a case where operation of the first component 44 has been completed, the first slave controller 70 proceeds to step S58.

In step S58, the first slave controller 70 transmits a first completion signal to the master controller 62 and then ends the process.

In a case where a first component permission signal has not been received from the master controller 62 in step S55, the first slave controller 70 proceeds to step S59. In step S59, the first slave controller 70 determines whether an operation suspension condition is satisfied. The operation suspension condition is satisfied in a case where, for example, a first predetermined time elapses from when the first component operation condition is satisfied. The first slave controller 70 proceeds to step S55 in a case where the operation suspension condition is not satisfied. The first slave controller 70 ends the process in a case where the operation suspension condition is satisfied.

In a case where the control state is not the first control state in step S52, the first slave controller 70 proceeds to step S60. In step S60, the first slave controller 70 initiates operation of the first component 44.

Figure 8:
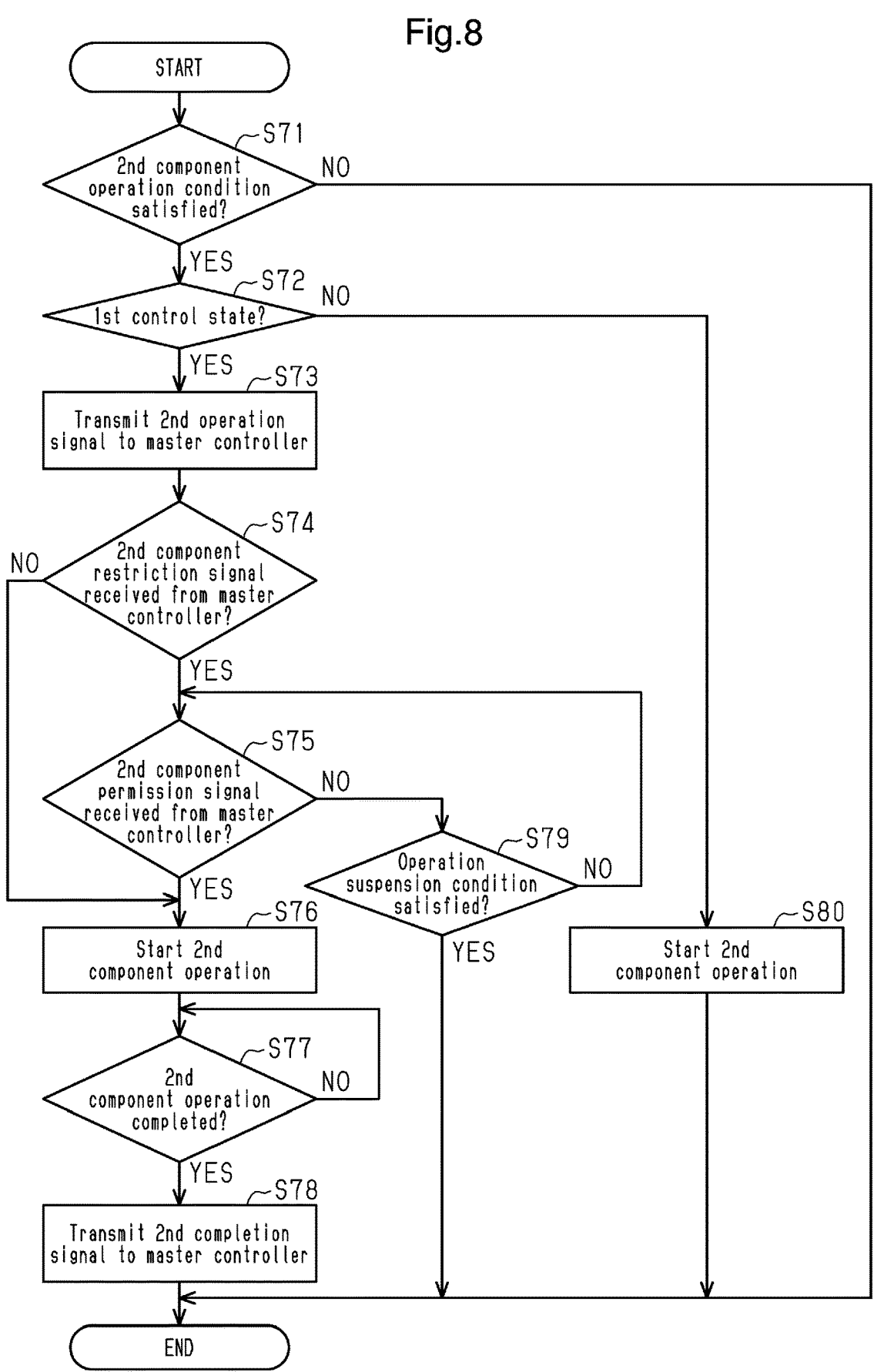
FIG. 8 is a flowchart showing a process for controlling the second component executed by a second slave controller illustrated in FIG. 2.

With reference to FIG. 8, a process executed by the second slave controller 76 to control the second component 46 will now be described. In a case where, for example, the second slave controller 76 is supplied with electric power, the second slave controller 76 starts the process from step S71 of the flowchart illustrated in FIG. 8. Upon completion of the flowchart illustrated in FIG. 8, the second slave controller 76 repeats the process from step S71 of FIG. 8 in predetermined cycles until, for example, the supply of electric power is stopped.

In step S71, the second slave controller 76 determines whether the second component operation condition is satisfied. In a case where the second component operation condition is not satisfied, the second slave controller 76 ends the process. In a case where the second component operation condition is satisfied, the second slave controller 76 proceeds to step S72.

In step S72, the second slave controller 76 determines whether the control state is the first control state. In a case where the control state is the first control state, the second slave controller 76 proceeds to step S73. In step S73, the second slave controller 76 transmits a second operation signal to the master controller 62 and then proceeds to step S74.

In step S74, the second slave controller 76 determines whether a second component restriction signal has been received from the master controller 62. In a case where the second component restriction signal has not been received from the master controller 62, the second slave controller 76 proceeds to step S76. In a case where the second component restriction signal has been received from the master controller 62, the second slave controller 76 proceeds to step S75.

In step S75, the second slave controller 76 determines whether a second component permission signal has been received from the master controller 62. In a case where a second component permission signal has been received from the master controller 62, the second slave controller 76 proceeds to step S76.

In step S76, the second slave controller 76 initiates operation of the second component 46 and then proceeds to step S77. In step S77, the second slave controller 76 determines whether operation of the second component 46 has been completed. In a case where operation of the second component 46 has not been completed, the second slave controller 76 performs step S77 again. In a case where operation of the second component 46 has been completed, the second slave controller 76 proceeds to step S78.

In step S78, the second slave controller 76 transmits a second completion signal to the master controller 62 and then ends the process.

In a case where a second component permission signal has not been received from the master controller 62 in step S75, the second slave controller 76 proceeds to step S79. In step S79, the second slave controller 76 determines whether an operation suspension condition is satisfied. The operation suspension condition is satisfied in a case where, for example, a second predetermined time elapses from when the second component operation condition is satisfied. The second slave controller 76 proceeds to step S75 in a case where the operation suspension condition is not satisfied. The second slave controller 76 ends the process in a case where the operation suspension condition is satisfied.

In a case where the control state is not the first control state in step S72, the second slave controller 76 proceeds to step S80. In step S80, the second slave controller 76 initiates operation of the second component 46.

The human-powered vehicle control device 60 can restrict simultaneous operation of the first component 44 and the second component 46 in the first control state through the processes of FIGS. 3 to 8. This allows the human-powered vehicle control device 60 to control the first component 44 and the second component 46 so that the sum of the electric power consumed by operation of the first component 44 and the electric power consumed by operation of the second component 46 is less than or equal to a predetermined electric power.

In one example, the master controller 62 is configured to control the first component 44 and the second component 46 in accordance with the occurrence of an anomaly. For example, the master controller 62 determines that an anomaly has occurred in a case where the temperature of the drive unit 34 reaches a predetermined temperature. For example, the master controller 62 determines that an anomaly has occurred in a case where the voltage level of the battery 36 becomes less than or equal to a predetermined voltage level.

In one example, the master controller 62 is configured to control the first component 44 and the second component 46 so that the first component 44 and the second component 46 do not operate in a case where an anomaly occurs. In one example, the master controller 62 is configured to transmit an operation suspension signal to the first slave controller 70 and the second slave controller 76 so that the first component 44 and the second component 46 do not operate.

Figure 9:
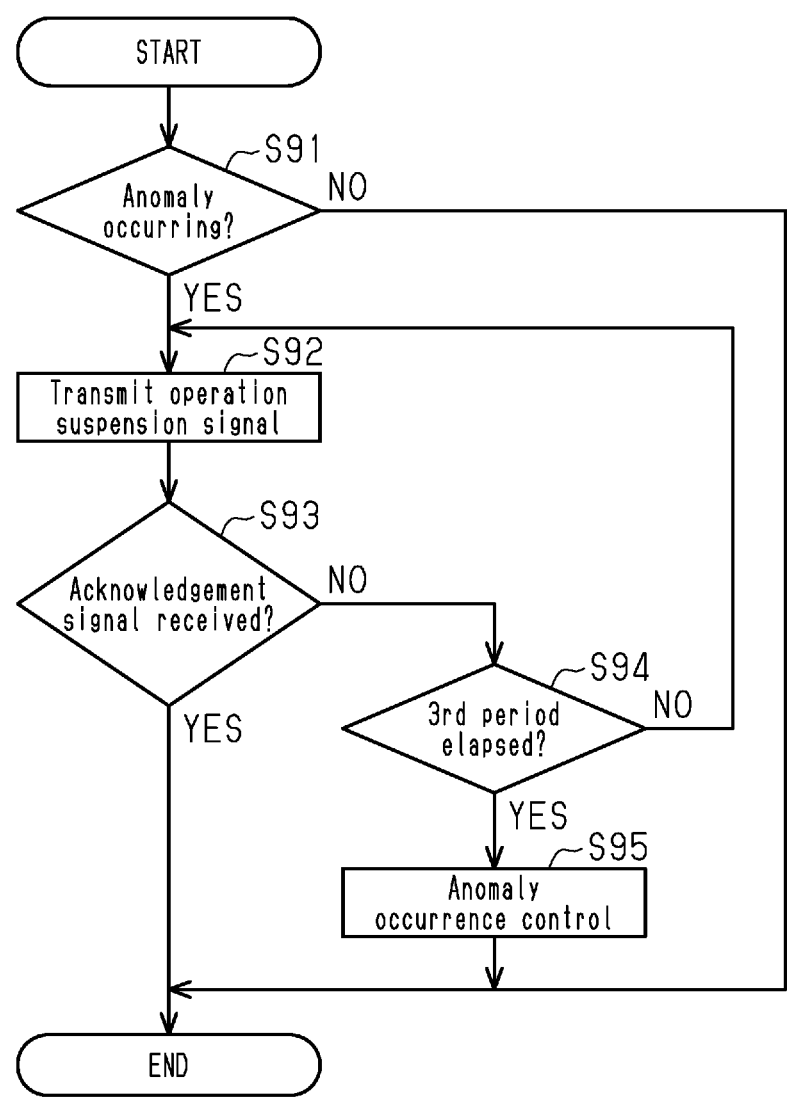
FIG. 9 is a flowchart showing a process for controlling the first component and the second component in a case where an anomaly occurs executed by the master controller illustrated in FIG. 2.

With reference to FIG. 9, a process executed by the master controller 62 to control the first component 44 and the second component 46 in a case when an anomaly occurs will now be described. In a case where, for example, the master controller 62 is supplied with electric power, the master controller 62 starts the process from step S91 of the flowchart illustrated in FIG. 9. Upon completion of the flowchart illustrated in FIG. 9, the master controller 62 repeats the process from step S91 of FIG. 9 in predetermined cycles until, for example, the supply of electric power is stopped.

In step S91, the master controller 62 determines whether an anomaly is occurring. In a case where there is no anomaly, the master controller 62 ends the process. In a case where an anomaly is occurring, the master controller 62 proceeds to step S92. In step S92, the master controller 62 transmits an operation suspension signal and then proceeds to step S93.

In step S93, the master controller 62 determines whether an acknowledgement signal has been received. In a case where an acknowledgment signal is received, the master controller 62 ends the process. In a case where an acknowledgment signal is not received, the master controller 62 proceeds to step S94. In step S94, the master controller 62 determines whether a third period has elapsed. The master controller 62 determines that the third period has elapsed in a case where a period from when an anomaly occurred in step S91 becomes greater than or equal to the third period. The master controller 62 proceeds to step S92 in a case where the third period has not elapsed. The master controller 62 proceeds to step S95 in a case where the third period has elapsed.

In step S95, the master controller 62 executes anomaly occurrence control and then ends the process. During the anomaly occurrence control, the master controller 62, for example, shuts out the first slave controller 70 and the second slave controller 76. During the anomaly occurrence control, the master controller 62, for example, stops the supply of electric power to the first slave controller 70 and the second slave controller 76.

Figure 10:
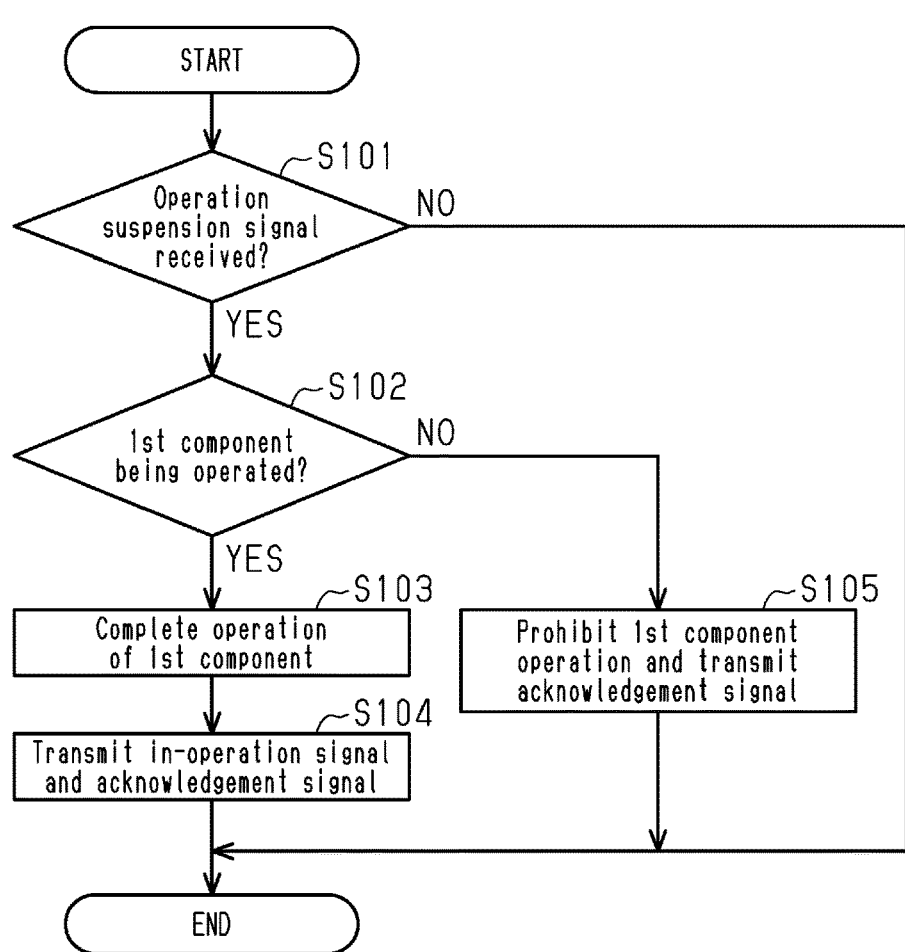
FIG. 10 is a flowchart showing a process for controlling the first component and the second component in a case where an anomaly occurs executed by the first slave controller illustrated in FIG. 2.

With reference to FIG. 10, a process executed by the first slave controller 70 to control the first component 44 in a case where an anomaly occurs will now be described. In a case where, for example, the first slave controller 70 is supplied with electric power, the first slave controller 70 starts the process from step S101 of the flowchart illustrated in FIG. 10. Upon completion of the flowchart illustrated in FIG. 10, the first slave controller 70 repeats the process from step S101 of FIG. 10 in predetermined cycles until, for example, the supply of electric power is stopped.

In step S101, the first slave controller 70 determines whether an operation suspension signal has been received. In a case where the operation suspension signal has not been received, the first slave controller 70 ends the process. In a case where the operation suspension signal has been received, the first slave controller 70 proceeds to step S102.

In step S102, the first slave controller 70 determines whether the first component 44 is being operated. In a case where the first component 44 is being operated, the first slave controller 70 proceeds to step S103. In step S103, the first slave controller 70 completes operation of the first component 44 and then proceeds to step S104. In step S104, the first slave controller 70 transmits an in-operation signal and an acknowledgement signal to the master controller 62 and then ends the process.

In a case where the first component 44 is not being operated in step S102, the first slave controller 70 proceeds to step S105. In step S105, the first slave controller 70 prohibits operation of the first component 44 and transmits an acknowledgement signal to the master controller 62 before ending the process.

The second slave controller 76 executes a process for controlling the second component 46 in a case where an anomaly occurs in the same manner as the flowchart illustrated in FIG. 10. The process executed by the second slave controller 76 to control the second component 46 in a case where an anomaly occurs can be illustrated with the flowchart of FIG. 10 by replacing the first slave controller 70 with the second slave controller 76 and replacing the first component 44 with the second component 46.

In the human-powered vehicle control device 60, the master controller 62 can restrict operation of the first slave controller 70 and the second slave controller 76 in a case where an anomaly occurs through the processes of FIGS. 9 and 10.

In one example, identification information used for communication and control is set for each of the master controller 62, the first slave controller 70, and the second slave controller 76. In one example, the master controller 62 is configured to update the identification information of at least one of the master controller 62, the first slave controller 70, and the second slave controller 76 in accordance with a signal from an external device.

The identification information is, for example, an ID automatically assigned to each slave controller in accordance with a communication protocol. In a case where the maximum number of IDs is small like in CAN, the identification information is manually updated to avoid duplicating IDs.

Figure 11:
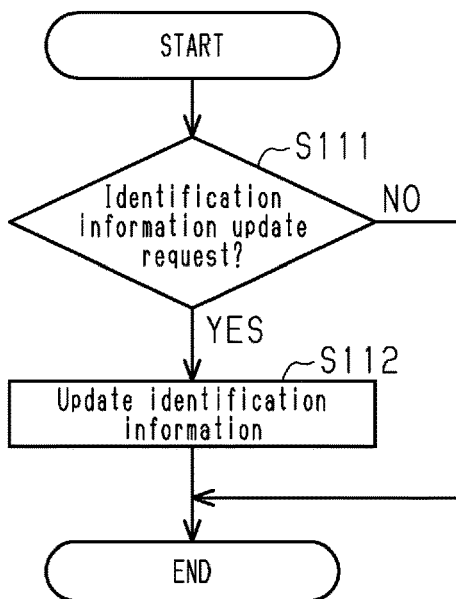
FIG. 11 is a flowchart of a process for updating identification information executed by the master controller illustrated in FIG. 2.

With reference to FIG. 11, a process executed by the master controller 62 to update identification information will now be described. In a case where, for example, the master controller 62 is supplied with electric power, the master controller 62 starts the process from step S111 of the flowchart illustrated in FIG. 11. Upon completion of the flowchart illustrated in FIG. 11, the master controller 62 repeats the process from step S111 of FIG. 11 in predetermined cycles until, for example, the supply of electric power is stopped.

In step S111, the master controller 62 determines whether there is a request for updating identification information. In a case where there is no request for updating identification information, the master controller 62 ends the process. In a case where there is a request for updating identification information, the master controller 62 proceeds to step S112. In step S112, the master controller 62 updates the identification information.

Modifications

The description related with the embodiment exemplifies, without any intention to limit, applicable forms of a control device for a human-powered vehicle and a component for a human-powered vehicle according to the present disclosure. The human-powered vehicle control device and the component according to the present disclosure is applicable to, for example, modifications of the above embodiment that are described below and combinations of at least two of the modifications that are consistent with each other. In the modifications described hereinafter, same reference numerals are given to those elements that are the same as the corresponding elements of the above embodiment. Such elements will not be described in detail.

At least one of the first component 44 and the second component 46 can include the motor 34A that applies a propulsion force to the human-powered vehicle 10.

At least one of the first component 44 and the second component 46 can include at least one of an electric adjustable seatpost, an electric brake, and electric brake, and a lighting device.

The human-powered vehicle control device 60 can include three or more slave controllers. In a case where the human-powered vehicle control device 60 includes three or more slave controllers, the master controller 62 can be configured to restrict operation of the three or more slave controllers. In a case where the human-powered vehicle control device 60 includes three or more slave controllers, the master controller 62 can be configured to restrict simultaneous operation of two or more slave controllers or restrict simultaneous operation of three or more slave controllers.

The component 40 can be configured to allow wireless communication to be performed between the first component 44 and the second component 46. In a case where the component 40 is configured to allow wireless communication to be performed between the first component 44 and the second component 46, each of the second master communication unit 68, the first slave communication unit 74, and the second slave communication unit 80 can include, for example, a wireless communication unit.

The component 40 can be configured to allow wireless communication to be performed with the drive unit 34. In a case where the component 40 is configured to allow wireless communication to be performed with the drive unit 34, the first master communication unit 66 can include, for example, a wireless communication unit.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A human-powered vehicle control device for a human-powered vehicle, the human-powered vehicle control device comprising:

a master electronic controller configured to control a first component and a second component, the first component being configured to be controlled by at least one of the master electronic controller and a first slave electronic controller, and the master electronic controller being configured to restrict operation of at least one of the first component and the second component based on a first operation signal in a case where the first component is controlled by the first slave electronic controller, the first operation signal being transmitted from the first slave electronic controller, and the first operation signal being received by the master electronic controller.

2. The human-powered vehicle control device according to claim 1, wherein the master electronic controller is configured to permit operation of the second component in a case where the first component is operated by the first slave electronic controller and the first component completes an operation, or in a case where the first component is operated by the first slave electronic controller and a first period elapses after the first component initiates an operation.

3. The human-powered vehicle control device according to claim 1, wherein:

the first slave electronic controller is configured to transmit a first completion signal to the master electronic controller in a case where the first component completes an operation; and the master electronic controller is configured to permit operation of the second component based on the first completion signal.

4. The human-powered vehicle control device according to claim 1, wherein:

the second component is configured to be controlled by at least one of the master electronic controller and a second slave electronic controller; and the master electronic controller is configured to restrict operation of at least one of the first component and the second component based on a second operation signal transmitted from the second slave electronic controller in a case where the second component is controlled by the second slave electronic controller.

5. The human-powered vehicle control device according to claim 4, wherein the master electronic controller is configured to permit operation of the first component in a case where the second component is operated by the second slave electronic controller and the second component completes an operation, or in a case where the second component is operated by the second slave electronic controller and a second period elapses after the second component initiates an operation.

6. The human-powered vehicle control device according to claim 4, wherein:

the second slave electronic controller is configured to transmit a second completion signal to the master electronic controller in a case where the second component completes an operation; and the master electronic controller is configured to permit operation of the first component based on the second completion signal.

7. The human-powered vehicle control device according to claim 5, wherein the master electronic controller is configured to transmit a second component restriction signal that restricts initiation of operation of the second component to the second slave electronic controller in order to restrict operation of the second component.

8. The human-powered vehicle control device according to claim 7, further comprising:

the second slave electronic controller, the second slave electronic controller being configured to control the second component so that the second component initiates an operation in a case where a second component operation condition for initiating operation of the second component is satisfied and the second component restriction signal is not received from the master electronic controller.

9. The human-powered vehicle control device according to claim 8, wherein the second slave electronic controller is configured to control the second component so that the second component does not initiate an operation in a case where the second component operation condition is satisfied and the second component restriction signal is received from the master electronic controller.

10. The human-powered vehicle control device according to claim 1, wherein the master electronic controller is configured to transmit a first component restriction signal for restricting initiation of operation of the first component to the first slave electronic controller in order to restrict operation of the first component.

11. The human-powered vehicle control device according to claim 10, further comprising:

the first slave electronic controller, the first slave electronic controller being configured to control the first component so that the first component initiates an operation in a case where a first component operation condition for initiating operation of the first component is satisfied and the first component restriction signal is not received from the master electronic controller.

12. The human-powered vehicle control device according to claim 11, wherein the first slave electronic controller is configured to control the first component so that the first component does not initiate an operation in a case where the first component operation condition is satisfied and the first component restriction signal is received from the master electronic controller.

13. The human-powered vehicle control device according to claim 11, wherein:

the first slave electronic controller is configured to switch a control state between a first control state and a second control state;

the first slave electronic controller is configured to transmit the first operation signal to the master electronic controller if the first component operation condition is satisfied in a case where the control state is the first control state; and the first slave electronic controller is configured to control the first component so that the first component initiates an operation without the first slave electronic controller transmitting the first operation signal to the master electronic controller if the first component operation condition is satisfied in a case where the control state is the second control state.

14. The human-powered vehicle control device according to claim 13, wherein:

the master electronic controller is configured to transmit a switch signal to the first slave electronic controller to switch the control state of the first slave electronic controller between the first control state and the second control state; and the first slave electronic controller is configured to switch the control state between the first control state and the second control state based on the switch signal.

15. The human-powered vehicle control device according to claim 1, wherein the first slave electronic controller is provided in the first component.

16. The human-powered vehicle control device according to claim 1, wherein at least one of the first component and the second component includes a transmission device.

17. The human-powered vehicle control device according to claim 1, wherein at least one of the first component and the second component includes a motor that applies a propulsion force to a human-powered vehicle.

18. The human-powered vehicle control device according to claim 1, wherein the first component and the second component are configured to be supplied with electric power from a battery via a drive unit including a motor that applies a propulsion force to a human-powered vehicle.

19. The human-powered vehicle control device according to claim 18, wherein the master electronic controller is provided in a human-powered vehicle component that connects the drive unit to the first component and the second component in a manner allowing for communication.

20. A component for a human-powered vehicle, the component comprising:

the human-powered vehicle control device according to claim 1.

21. The component according to claim 20, wherein the first component and the second component are configured to be supplied with electric power from a battery via a drive unit including a motor that applies a propulsion force to a human-powered vehicle, the component comprising:

a connector that connects the drive unit to the first component and the second component in a manner allowing for communication.

* * * * *